(12) United States Patent
Logvinov et al.

(10) Patent No.: US 8,050,287 B2
(45) Date of Patent: Nov. 1, 2011

(54) INTEGRATED UNIVERSAL NETWORK ADAPTER

(75) Inventors: Oleg Logvinov, East Brunswick, NJ (US); Brion Ebert, Easton, PA (US)

(73) Assignee: STMicroelectronics, Inc., Coppell, TX (US)

( * ) Notice: Subject to any disclaimer, the term of this patent is extended or adjusted under 35 U.S.C. 154(b) by 44 days.

(21) Appl. No.: 12/283,707

(22) Filed: Sep. 15, 2008

(65) Prior Publication Data

US 2009/0022175 A1   Jan. 22, 2009

Related U.S. Application Data

(63) Continuation of application No. 10/947,678, filed on Sep. 23, 2004, now Pat. No. 7,440,443.

(60) Provisional application No. 60/505,261, filed on Sep. 23, 2003.

(51) Int. Cl.
*H04L 12/413*   (2006.01)

(52) U.S. Cl. .................................................. 370/445
(58) Field of Classification Search .................. None
See application file for complete search history.

(56) References Cited

U.S. PATENT DOCUMENTS

| | | | |
|---|---|---|---|
| 6,560,234 B1 * | 5/2003 | Ben-Michael et al. | 370/401 |
| 2002/0031226 A1 * | 3/2002 | Simonsen et al. | 380/255 |
| 2002/0145996 A1 * | 10/2002 | Robinson et al. | 370/352 |
| 2003/0056226 A1 * | 3/2003 | Lazarus et al. | 725/129 |
| 2003/0067910 A1 * | 4/2003 | Razazian et al. | 370/352 |

\* cited by examiner

*Primary Examiner* — Raj Jain
(74) *Attorney, Agent, or Firm* — Slater & Matsil, L.L.P.

(57) ABSTRACT

An integrated network adapter is operable to establish a network interface with a plurality of media types, including at least a power line network and a telephone line network, based on pre-configuration, upon initialization and dynamically during operation. The adapter further is operable to establish network interfaces simultaneously or separately with a plurality of media types and provide that a communications event can occur simultaneously or separately over a plurality of media types.

25 Claims, 4 Drawing Sheets

INTEGRATED UNIVERSAL NETWORK ADAPTER

CROSS REFERENCE TO RELATED APPLICATION

This application is a continuation of and claims the priority benefit of U.S. patent application Ser. No. 10/947,678 filed on Sep. 23, 2004 and entitled "Integrated Universal Network Adapter," now issued as U.S. Pat. No. 7,440,443, which claims priority to U.S. Provisional Application No. 60/505,261, filed on Sep. 23, 2003, assigned to the assignee of this application, and entitled "Integrated Universal Network Adapter," now expired, which applications are hereby incorporated by reference herein.

FIELD OF THE INVENTION

The present invention relates generally to data transmission over local area communications networks and, more particularly, to a network interface for interfacing with various communications media types constituting respective local area communications networks that include a power line network and a telephone line network.

BACKGROUND OF THE INVENTION

A common power transmission network can be viewed as having three (3) main segments. A distribution access network of medium voltage power lines, configured in a loop and several miles in length, connects a standard power substation to an area of homes and businesses. At various points on the loop, step down transformers provide a series of 110-240 V low voltage access lines, depending on the country, to a small number of homes and/or businesses. At the end of each one of these lines, a meter or meters is typically present for each electricity customer served by that line. On the other side of each meter is a typical in-home or in-building electricity distribution network, which is contained inside a home or business.

Currently, Orthogonal Frequency Division Multiplexing (OFDM) based communication methods are available and used in various types of mediums, both wired and wireless, such as power line communications networks and telephone line networks. It is well established that phone line networks, like power line networks, are a suitable high speed communication channel for FDM based systems. See, for example, HPNA 2.0 Specification, October 1999, http://www.homepna.org.

Currently, a single, separate network interface adapter is required to establish an interface for each available communications media network. If interfaces to several communications media types are desired, several single network interfaces must be used, which increases overall power consumption, space occupied by communications network components and cost of operation. In addition, it is not possible, using currently available network interface adapters, to dynamically switch between or among several available communications media types for establishing a network interface to each of the individual media. Further, current network interfaces adapters do not readily allow for establishing a plurality of network interfaces using a plurality of available communications media types, including power line and telephone networks, such that the data transmission performance can be optimized.

Therefore, there is a need for a low cost, low power consumption, compact, flexibly operable and reconfigurable communications network interface adapter that can provide for interfacing with a plurality of communications network media types, which include at least a power line communications network and a telephone link network, and that can perform the required data signal processing to provide that communications events can occur on one or more of the media types separately or simultaneously.

SUMMARY OF THE INVENTION

In accordance with the present invention, an integrated communications network adapter provides that a communications network interface can be established to at least one of a plurality of communications media types, where the communications media include at least a power line communications ("PLC") network and a telephone line network. The integrated network adapter can include reconfigurable instantiations of major functional blocks of, preferably, an OFDM based communications system, such as Physical Layer interface ("PHY") and Media Access Control ("MAC") functionalities, and separate interface couplers for coupling to respective plurality of the communications media types. In the network adapter, each of the functional blocks can include a plurality of instantiations to provide that an interface can be established to each of the available communications media types, such that information and payload transfer can be performed using the networks respectively corresponding to the media types.

In a first preferred embodiment, the PHY and MAC functionalities, along with the coupling interface, of the network adapter are preconfigured, using hardware such as a jumper or switch, to provide that an interface can be established to a selected one of the plurality of the communications media.

In another preferred embodiment, the MAC functionality is adapted to control which of the plurality of the communications media an interface is established upon initialization of the network adapter for operation. Control of the network interface established to a particular communications media type can be achieved by loading software or manipulating hardware, such as an electronically controllable relay, or other electronic switching hardware.

In a further preferred embodiment, each of the PHY and MAC functionalities of the network adapter can dynamically control, on a transmission-by-transmission basis, to which of the communications media an interface is established. Dynamic switching of a network interface established between or among available communications media types is performed based on network performance data and the type of data to be transmitted.

In still another preferred embodiment, the PHY and MAC functionalities of the network adapter provide for shared control of network interfacing, such that network interfaces can be established simultaneously or separately with two or more of the communications media types to provide that a communications event can occur simultaneously on two or more communications media.

BRIEF DESCRIPTION OF THE DRAWINGS

Other objects and advantages of the present invention wall be apparent from the following detailed description of the presently preferred embodiments, which description should be considered in conjunction with the accompanying drawings in which like references indicate similar elements and in which.

DETAILED DESCRIPTION OF THE INVENTION

Figure 1:
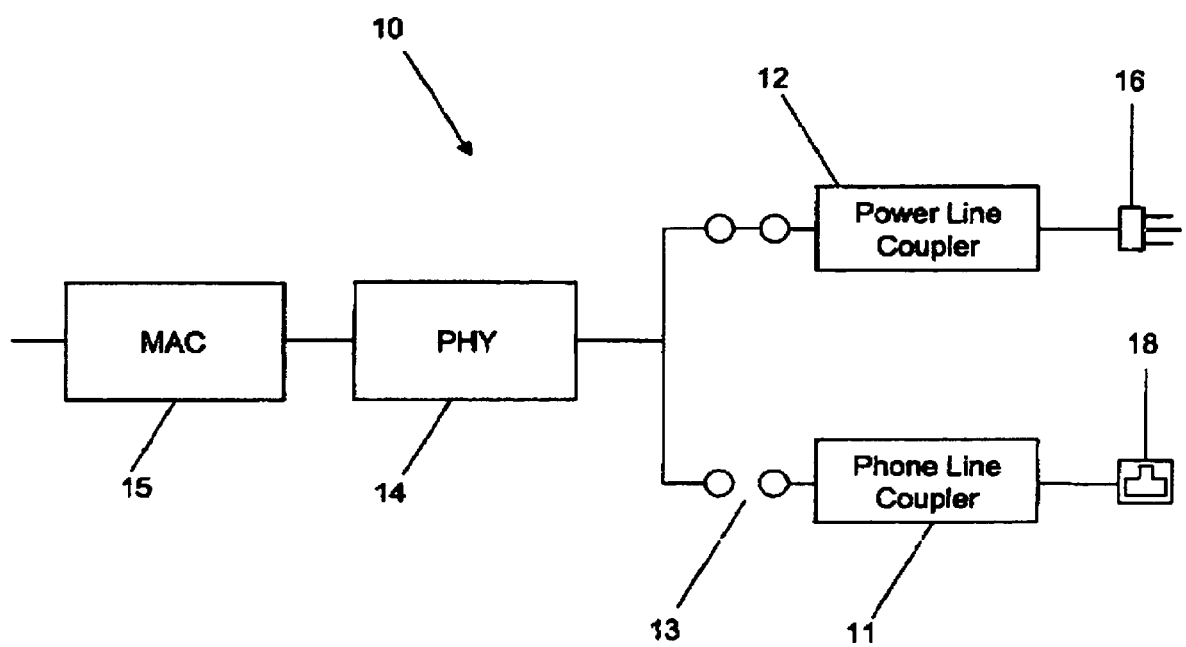
FIG. 1 is a block diagram of an integrated network adapter adapted to accommodate pre-configuration in accordance with the present invention.

FIG. 1 is a preferred embodiment of an OFDM based integrated network adapter ("INA") 10 operable to provide an interface with a plurality of network media types including at least power line and phone line media types in accordance with the present invention. The power line network can be OFDM based, such as in HomePlug 1.0, and can include (1) a common local power line network in a home, business or other environment, and (2) a common local phone line network in a home, business or other environment. Both of these networks can be used to support communication between electronic appliances coupled to these lines, as well as communication between a power line network and a phone line or other type of wired or wireless network. It is to be understood that other physical and wireless networks that may be present or available in a home or business also can constitute the network media types for interfacing with the INA of the present invention.

In accordance with the present invention, the INA 10 exploits the highly programmable, flexible OFDM based communications system, which is typically used in power line and a phone line networks, by including many of the same internal system hardware and software functional modules utilized in the communication media types for which the establishment of a network interface is desired. By utilizing the same functional modules as existing for the networks of the respective communication media, the inventive INA 10 achieves significant cost of scale reductions for a programmable or ASIC based implementation, and the functionality and capability of a the INA is also increased.

In the preferred illustrated embodiment of FIG. 1, the INA 10 includes a same Physical Layer Interface ("PHY") module 14 and Media Access Control ("MAC") module 15 as conventionally used for establishing an interface with a power line network and a phone line media. The INA 10 further includes a power line coupler 12 for coupling to a conventional power outlet 16 and a phone line coupler 3 for coupling to a conventional phone line outlet 18. The INA 10 also includes an interface circuit 13 that can establish a communications connection to both a power line network and a phone line network. The interface circuit 13 includes a pre-configuration selection capability in the form of a jumper or switch that allows for selection of either the power line or phone line media network for interfacing with the INA 10.

The MAC module 15 and PHY module 14 of the INA 10, respectively, include functionalities and technologies well known in the art for an OFDM based transceiver.

In accordance with the present invention, the INA 10 establishes the physical connection and electronic signal link to a power line or phone line network and a data input/output ("I/O") device, such as a computer (not shown), as well known in the art, and furthermore selectively controls the transmission of data on the power line or phone line network. The INA 10 performs OFDM signal processing using techniques well known in the prior art, and includes the functionality to modify the signal processing operations, as suitable, based on the physical medium used for operation. See, for example, U.S. patent application Ser. Nos. 10/211,033, filed Aug. 2, 2002 and 10/309,567, filed Dec. 4, 2002, each of which is assigned to the assignee of this application and incorporated by reference herein, for a description of conventional OFDM based power line transceiver construction and operation. It is to be understood that the MAC and PHY modules 15 and 14 of the INA 10 may consist of a software module, a hardware module or a combined hardware/software module. In addition, the MAC and PHY modules 15 and 14 suitably may contain a memory storage area, such as RAM, for storage of data and instructions for performing processing operations in accordance with the present invention. Alternatively, instructions for performing processing operations can be stored in hardware in one or more of the modules 14 and 15. The modules 14 and 15 can be combined into a single integral module, or a plurality of composite modules, using techniques well known in the art. The coupling of the modules would include standard interface and protection components whose uses are well known in the art, and would complete the physical interface to each of the network mediums.

Figure 2:
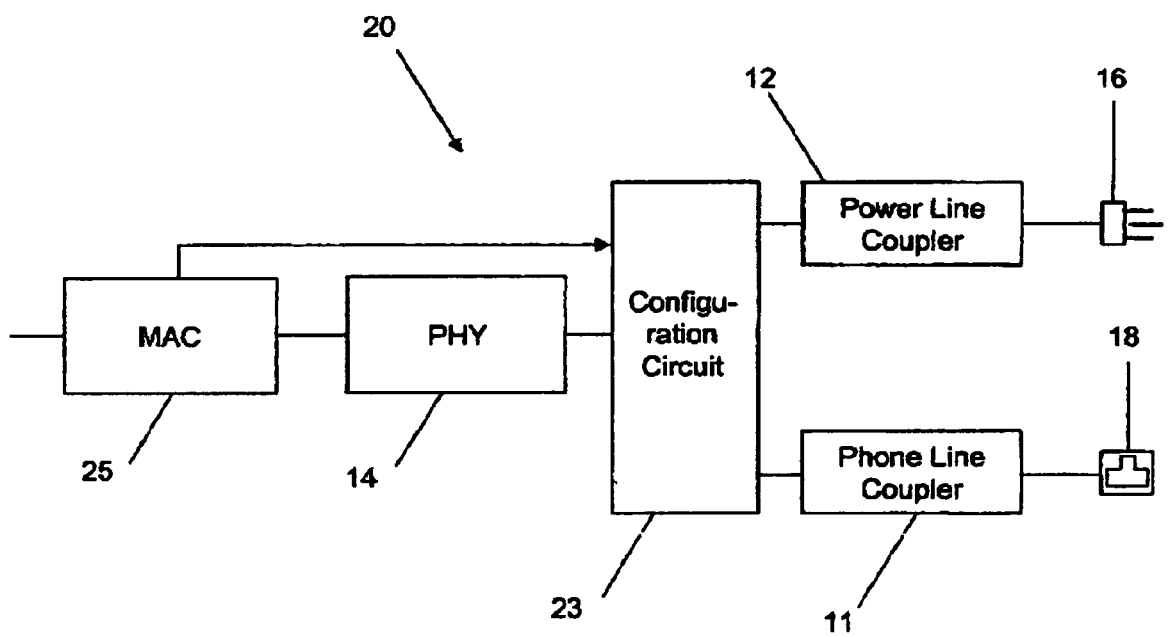
FIG. 2 is a block diagram of an integrated network adapter adapted to accommodate run-time configuration in accordance with the present invention.

FIG. 2 is a preferred embodiment of an OFDM based INA 20 including selection circuitry that provides for run-time configuration and operation on a run-time selected media type. The INA 20 incorporates all the functionalities of the INA 10, described above with reference to FIG. 1, and further includes run-time selection circuitry in a configuration circuit 23. The run-time selection circuitry, which can be in the form of electronically controllable relay or like device, provides that the physical medium to be used for data transmission can be selected when the INA 20 starts operating. While the INA 20 is initialized for operation or booted up, the MAC module 25, which is coupled directly to the configuration circuit 23, transmits control signals to the circuit 23 to select a physical network for transmission of communications data signals. The MAC module 25, which includes a combination of hardware circuitry and software configuration, based on for example a software load and run-time parameters, transmits control signals to set up the configuration circuit 23. Based on the control signals, the circuit 23 selects either the power line coupler 12 or the phone line coupler 11 for establishing a network interface. The configuration circuit 23, for example, can constitute a relay device that connects the coupler 12 to the power line outlet 15 or the coupler 11 to telephone line outlet 18 to provide that the data signals are routed from the PHY module 14 to a power line network or telephone line network, respectively.

Figure 3:
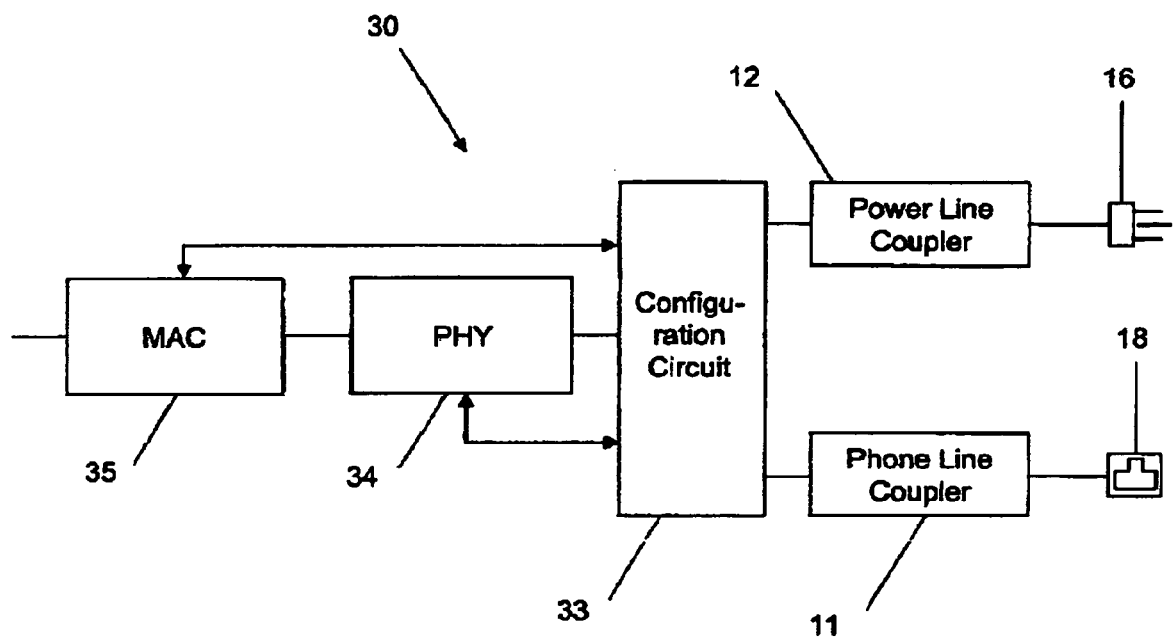
FIG. 3 is a block diagram of an integrated network adapter adapted to accommodate dynamic configuration in accordance with the present invention.

FIG. 3 is further preferred embodiment of an INA 30, which includes the functionalities of the INA 10 and INA 20 and furthermore operates to dynamically select the network medium to which a network interface is established, such that the physical medium used for a particular data communication transmission can be switched while the INA 30 is in operation. In other words, each communications event that is scheduled to be completed by a computer or other device (not shown) connected to the INA 30 can be performed using either the power line or the phone line network, where the network medium selected as the network interface occurs while the INA 30 is operating. Referring to FIG. 3, a MAC module 35 and a PHY module 34 in the INA 30 both include control signal lines that are coupled to a configuration circuit 33. Each of the MAC module 35 and the PHY module 34 can transmit control signals to the configuration circuit 33 to select the network over which data transmission is to occur. In a preferred embodiment, the dynamic selection of a network configuration performed by the MAC module 35 or the PHY module 34 is based on information available on the networks to which a network interface can be established. The information for dynamic selection can include network parameters such as connection status, signal strength, presence of traffic, noise levels, historical and real-time error rates, congestion indications and other like data. The MAC and PHY modules, as suitable, utilize such network parameters, preferably in conjunction with Quality of Service requirements associated with the data to be transmitted to determine the optimal transmission path for the aforementioned data. In still a further preferred embodiment, the MAC and PHY modules in the INA 30 evaluate other data specific requirements, such as those associated with streaming media or other applications, as part of the process of selecting the network for which an interface will be established.

Figure 4:
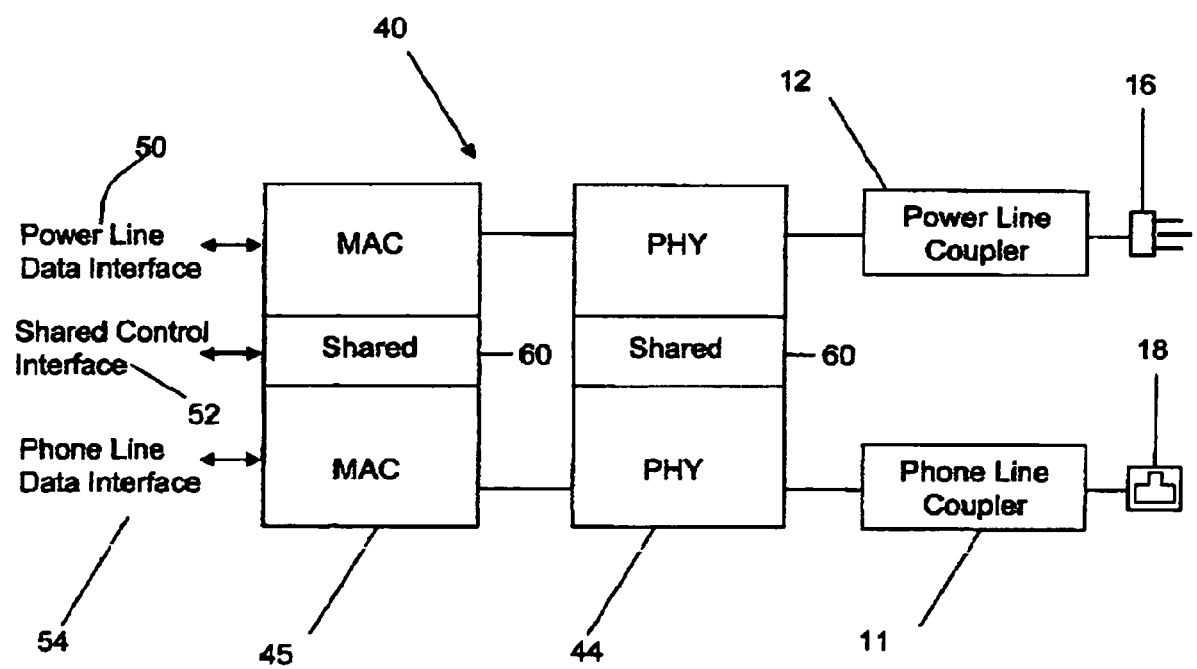
FIG. 4 is a block diagram of an integrated network adapter adapted to accommodate simultaneous interfacing with a plurality of communications media types in accordance with the present invention.

In accordance with the present invention, a single universal INA 40, as shown in FIG. 4, which preferably includes all of the functionalities of the INAs 10, 20 and 30, includes two or more physical interfaces and operates to establish a network interface simultaneously or separately to one or more communications mediums. Referring to FIG. 4, the INA 40 includes a PHY module 44 and a MAC module 45. The PHY module 44 includes a plurality of instantiations of PHY related functionality, where one instantiation is included for each communications medium to which a network interface can be established using a coupler of the INA 40. Similarly, the MAC module 45 includes a plurality of instantiations of MAC related functionality, where one instantiation is included for each communications medium to which a network interface can be established using a coupler of the INA 40. The INA 40 further includes a shared control interface 60 in the PHY module 44 coupled to each of the PHY instantiations. Referring to FIG. 4, which shows the couplers 11 and 12, the PHY module 44 includes connections from the PHY instantiations to the corresponding couplers. For example, the PHY instantiation in the module 44 associated with communications on a power line network is connected to the power line coupler 12. The MAC module 45 also includes MAC instantiations for connection to corresponding separate data interfaces, such as power line data interface 50 or a phone line data interface 54. The shared control interface 60 in the MAC module 45 is for connection to a shared control interface line 52, which connects to a computer or other communication control device (not shown). Based on the plurality of MAC and PHY instantiations in the INA 40, the INA 40 provides that more than one network medium can be simultaneously used to accomplish data communication. Advantageously, the INA 40 can be used in a communications system to provide that each packet of data can be routed to one or more available network mediums or multiple data packets can be transmitted over each of the available networks simultaneously.

In a preferred embodiment, the components in the PHY and MAC modules of the INA 40 blocks can be shared during use to achieve high efficiency communications. For example, the INA 40 can include an FFT block of an OFDM-based system as a shared resource for all of the available media or medium types.

In a further preferred embodiment, the functionalities and capabilities of the INA 30 and the INA 40 can be utilized in combination in a communications system. For example, the combined functionalities of the INA 30 and the INA 40 can be used in a communications system to dynamically select a network path (i) by associating the source and destination address with a best route path using historical and real-time information related to channel conditions, (ii) based on the QoS parameters of a data packet, and (iii) based on information related to the channel status.

In a further preferred embodiment, the INA 40 can select a network path using methods of discovering the best path through the network based on the simultaneous broadcast over all available media interfaces, or over all available and connected media types.

It is to be understood that the inventive INA can be adapted for use on the in-home or in-building segment of an electrical distribution network, or alternatively an intermediate segment of the power line network, where a power line and a wireless network may be present or desired to be present, such that the INA provides for selective use of one or both of these networks.

In another preferred embodiment, a communications system includes a plurality of INAs in accordance with the present invention configured in connection with all available media types to form one logical network. The individual INAs in the logical network provide a means for bridging and routing among multiple media types and the bridging and routing can be accomplished from one media type to another. Thus, the capability of a legacy network in the logical network can be expanded by bridging the legacy network to other networks in the logical network using the respective INA, and utilizing the advanced capabilities of the other networks of the logical network to add to the functionalities of the legacy network.

In a further preferred embodiment, the INA of the present invention utilizes other cost saving implementation methods and additional packet routing functionality features, such as described for example in U.S. Pat. Nos. 6,360,278 and 5,758,070, incorporated as references herein. For example, the inventive INA can select a network path based on routing functionality and using pattern recognition and Ethernet header lookup to determine the appropriate QoS requirements and the most suitable media and transmission path.

In an embodiment, an integrated network adapter (INA) includes a MAC module coupled to a PHY module. At least one of the MAC and PHY is coupled to a network configuration module, and the configuration module is coupled to a plurality of communications media couplers. The configuration module establishes a communications interface using at least one of the plurality of communications media couplers. In an embodiment, the configuration module dynamically selects one of the communications media couplers for establishing a network interface, where the dynamic selection is based on information available concerning the communications media to which an interface can be established. In an embodiment, the information includes a network parameter. The network parameter includes at least one of the following parameters: connection status, signal strength, presence of traffic, noise levels, historical and real-time error rates and congestion indications.

In an embodiment, the information further includes a Quality of Service requirement associated with a specific data type. For example, specific data types can include isochronous streaming data and prioritized asynchronous data. Isochronous streaming data can include high priority live broadcast voice and multimedia data that needs high priority transmission without jitter to allow for the appearance of natural conversation. Examples of prioritized asynchronous data includes information, such as email messages, that can be communicated successfully at lower priorities. In an embodiment, the MAC module uses the information to select a communications medium to which a network interface is to be established.

It is to be understood that the INA of the present invention can be suitably constructed for selecting a network path among a plurality of communications media, such as a coaxial cable network, in addition to power line and telephone line networks as illustrated in the drawings FIGS. 1-4. Where the INA of the present invention is for coupling to communications media in addition to power line and telephone line media, the INA preferably includes an automatic media detection functionality, for example within the PHY module, that detects the type of physical network medium characteristics. For example, the PHY module determines whether a communications network is 10Base-T based (data cable) or 10Base 2 or 5 based (coaxial cable), such as described in U.S. Pat. No. 5,469,437, incorporated as a reference herein. In an alternative preferred embodiment, the inventive INA performs automatic detection for establishing a network interface based on configuration frames received from a medium.

In another embodiment, the INA of the present invention is implemented wherein at least the PHY and MAC functions are implemented as a semiconductor component, or as a System-on-Chip (SoC). Alternatively, the inventive INA is implemented where at least the PHY, MAC, analog front end and at least some of the circuitry of the couplers are implemented in a System-in-Package design.

In a further alternative embodiment, the inventive INA is implemented as an SoC and contains a CPU and other relevant media type support through interfaces such as Ethernet, IEEE 1394, USB, etc. In still a further preferred embodiment, the implementation of the inventive INA is constructed so that the INA can be powered through a power line network or other network medium to which it is attached.

Although preferred embodiments of the present invention have been described and illustrated, it will be apparent to those skilled in the art that various modifications may be made without departing from the principles of the invention.

What is claimed is:

1. An integrated network adapter (INA) comprising:
   a Media Access Control ("MAC") module coupled to a Physical Layer Interface ("PHY") module, wherein at least one of the MAC and PHY is coupled to a network configuration module, wherein the configuration module is coupled to a plurality of communications media couplers, and wherein the configuration module establishes a communications interface using at least one of the plurality of communications media couplers;
   wherein the configuration module dynamically selects one of the communications media couplers for establishing a network interface;
   wherein the dynamic selection is based on information available concerning the communications media to which an interface can be established;
   wherein the information includes a network parameter including at least one of connection status, signal strength, presence of traffic, noise levels, historical and real-time error rates and congestion indications;
   wherein the information includes a Quality of Service requirement associated with specific data types, the specific data types including at least an isochronous streaming data type and a prioritized asynchronous data type; and
   wherein the MAC module uses the information to select a communications medium to which a network interface is to be established.

2. The INA of claim 1, wherein at least one of the MAC and PHY modules are adapted for controlling the communications interface established by the configuration module.

3. The INA of claim 1, wherein the PHY module performs communications signal processing based on Orthogonal Frequency Division Multiplexing (OFDM).

4. The INA of claim 1, wherein the configuration module includes circuitry pre-configured to provide for operation using a selected one of the communications media couplers.

5. The INA of claim 1, wherein the configuration module selects one of the communications media couplers for establishing a network interface at initialization.

6. The INA of claim 5, wherein the network interface is dynamically selected based on configuration frames received from media coupled to the couplers of the INA.

7. The INA of claim 1, wherein one of the media couplers includes a coaxial cable coupler.

8. The INA of claim 1, wherein the same PHY and MAC modules are selected for establishing a network interface simultaneously via the media couplers for coupling to each of a power line network, a telephone line network and a coaxial cable based network.

9. The INA of claim 8, wherein the PHY and MAC modules include at least one component whose use is shared for establishing a network interface.

10. The INA of claim 9, wherein the component is an FFT block used In OFDM-based system and is shared for establishing the interfaces to the power line, telephone line and cable based networks.

11. The INA of claim 1, wherein the PHY and MAC modules are implemented as at least one of a semiconductor component and a System-on-Chip (SoC).

12. The INA of claim 11, wherein the PHY, MAC, analog front end and at least some of the media couplers are implemented as the SoC, and further comprising a processor and media type support through interfaces.

13. The INA of claim 1, wherein the PHY, MAC, analog front end and at least some of the media couplers are implemented in System-in-Package.

14. The INA of claim 1, wherein the media coupler includes a power line coupler for providing electrical power for energizing the INA.

15. The INA of claim 1, wherein the MAC and PHY modules perform communication event bridging and routing from one media type to another through the media couplers.

16. The INA of claim 15, wherein the MAC and PHY modules uses pattern recognition and Ethernet header lookup to determine appropriate QoS requirements and a most suitable media and transmission path.

17. The INA of claim 1, wherein the network interface is dynamically selected by associating source and destination address of a data packet with a best mute path based on historical and real-time information related to channel conditions.

18. The INA of claim 17, wherein the best path through the network is determined based on simultaneous broadcast over all available media interfaces.

19. The INA of claim 17, wherein the best path through the network is determined based on simultaneous broadcast over all available and connected media types.

20. The INA of claim 1, wherein the network interface is dynamically selected based on the QoS parameters of a data packet to be transmitted and information related to the channel status.

21. The INA of claim 1 wherein one of the communication media couplers interfaces to a Powerline Communications medium.

22. The INA of claim 1 wherein one of the communication media couplers interfaces to a shielded or an unshielded twisted pair wire.

23. The INA of claim 1 wherein one of the communication media couplers interfaces to a fiber optic medium.

24. The INA of claim 1, where in the PHY and MAC modules are selected for establishing the communications interface simultaneously via any combination of two or more communication media couplers, wherein the data transmitted to or between the networks may be the same or different content, and sent to the same or different modules via multiple PHY networks.

25. The INA of claim 1, where in the PHY and MAC modules are selected for establishing the communications interface simultaneously via any combination of two or more communication media couplers, where in the media couplers may be the same type but operate on different frequency, physical or logical channels.

* * * * *

UNITED STATES PATENT AND TRADEMARK OFFICE
CERTIFICATE OF CORRECTION

| | |
|---|---|
| PATENT NO. | : 8,050,287 B2 |
| APPLICATION NO. | : 12/283707 |
| DATED | : November 1, 2011 |
| INVENTOR(S) | : Logvinov et al. |

It is certified that error appears in the above-identified patent and that said Letters Patent is hereby corrected as shown below:

In Col. 8, line 55, claim 17, delete "mute" and insert --route--.

Signed and Sealed this
Thirty-first Day of January, 2012

David J. Kappos
*Director of the United States Patent and Trademark Office*